United States Patent Office 3,808,319
Patented Apr. 30, 1974

3,803,319
MEDICINAL PREPARATION FOR
SKIN DISEASES
James J. Kanfoush, Brooklyn, N.Y., assignor of a fractional part interest to Farida M. Saad, Methuen, Mass.
No Drawing. Filed Nov. 25, 1968, Ser. No. 778,814
Int. Cl. A61k 17/00
U.S. Cl. 424—308       4 Claims

ABSTRACT OF THE DISCLOSURE

A preparation for treatment of some skin diseases and parasitic infestation, that includes benzylbenzoate, benzocaine, trichloroethylene and isopropyl alcohol. The trichloroethylene is the new ingredient and the dominating one in effecting a cure. It forms only a minor proportion, by weight, of the ingredients in my preparation.

---

The principal object of my invention is to provide a medicinal preparation for the treatment of skin diseases as, for instance, ringworm diseases such as athlete's foot, and also such diseases as mange in dogs and mange in humans, and the elimination of mites on dogs.

My medicinal preparation preferably contains benzylbenzoate, benzocaine, trichloroethylene and isopropyl alcohol or an equivalent volatile dispersant. It contains substantially the following formulation in parts by weight:

5 to 20% of benzylbenzoate
3 to 6% of benzocaine
2 to 6% of trichloroethylene
90 to 68% of alcohol, preferably ethyl alcohol or isopropyl alcohol or an equivalent antiseptic volatile dispersant.

Said benzocaine is included to serve in effecting prompt alleviation of pain and itching, being soluble in alcohol. It is not an essential ingredient; but a desirable one. In the event of its omission the proportion of said alcohol is increased accordingly.

A preferred formulation by weight is:

10% benzylbenzoate
3% benzocaine
2.5% trichloroethylene
84.5% isopropyl alcohol

To speed up the healing effect the proportion of trichloroethylene may be increased up to the point of 6% by weight, in which event the proportion of alcohol is reduced accordingly. However, the maximum proportion of trichloroethylene should be used with caution since it may cause discomfort to tender skin. In some cases it is desirable to gain the desired effect more gradually as when there is plenty of time to effect a cure using a relatively mild preparation in the proportion of trichloroethylene used, such as the above 2.5%.

My preparation is applied directly to the patient's skin, and this may be done as often as once a day, until the condition being treated clears up. If there are any places requiring treatment constituting a substantial area of the skin, in such an instance, treatment may be alternated, treating a certain place or places one day and the remaining place or places the next day.

In conclusion it will be understood that various changes may be made in the ingredients and proportions specified without departing from the spirit and scope of my invention, hence I do not intend to be limited to details hereinbefore described except as they may be specifically included in the claims.

What I claim is:
1. A preparation for treatment of athlete's foot comprising trichloroethylene providing from 2 to 6% by weight of the preparation, benzylbenzoate providing from 5 to 20% of the preparation by weight, and a liquid, volatile dispersant providing 74 to 93% of the preparation by weight.
2. A preparation for treatment of athlete's foot as set forth in claim 1, said trichloroethylene providing substantially 2½% by weight, said benzylbenzoate providing substantially 10% by weight, and said dispersant being alcohol providing substantially 87½% by weight.
3. A preparation for treatment of athlete's foot comprising trichloroethylene providing from 2 to 6% by weight of the preparation, benzylbenzoate providing from 5 to 20% of the preparation by weight, benzocaine providing from 3 to 6% of the preparation by weight, and a liquid volatile dispersant providing from 68% to 90% of the preparation by weight.
4. A preparation for treatment of athlete's foot as set forth in claim 3, said trichloroethylene providing substantially 2½% by weight, said benzylbenzoate providing substantially 10% by weight, said benzocaine providing substantially 3% by weight, and said dispersant being alcohol providing substantially 84½% by weight.

References Cited

UNITED STATES PATENTS

| 2,105,171 | 1/1938 | McCrea | 424—310 X |
| 2,187,598 | 1/1940 | Blaso | 424—310 X |
| 3,081,227 | 3/1963 | Wimberly | 424—310 X |

OTHER REFERENCES

Merck Index, 7th ed., 1960, pp. 137, 423, 579, 1060.

ALBERT T. MEYERS, Primary Examiner
L. SCHENKMAN, Assistant Examiner

U.S. Cl. X.R.
424—310, 343, 351